April 5, 1960 L. H. VAN ARSDALE 2,931,956
REGENERATIVE RADIO RECEIVER FOR REMOTELY CONTROLLED RELAY
Filed Feb. 6, 1956
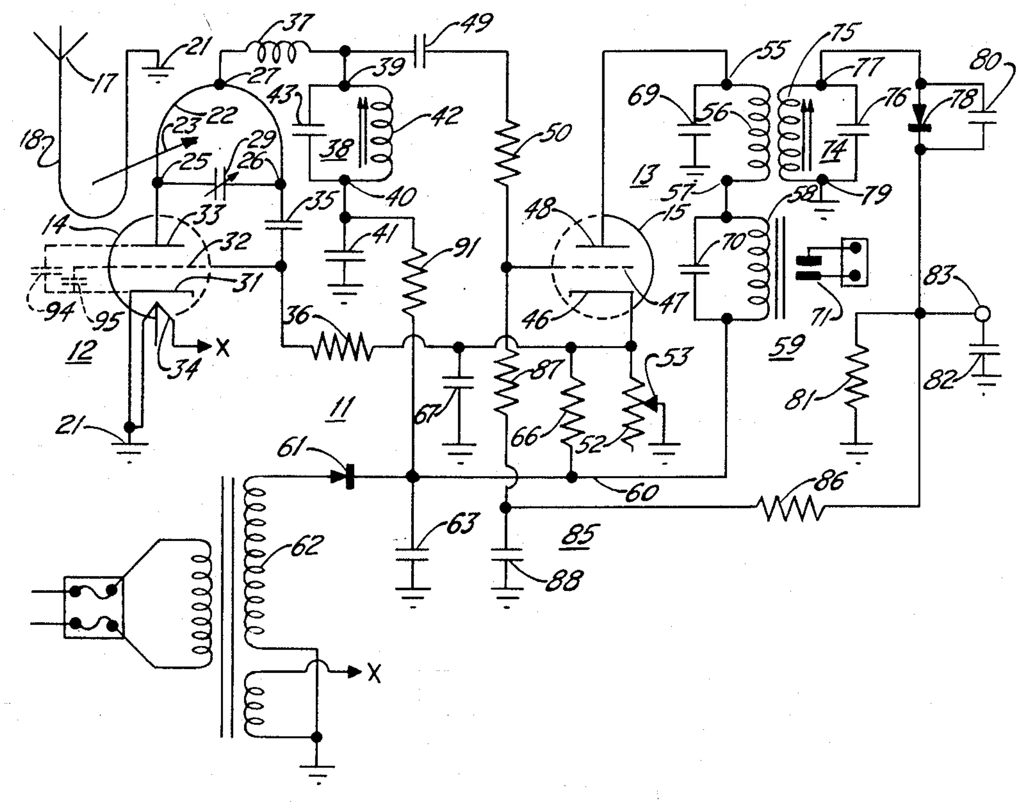
INVENTOR.
Lewis H. VanArsdale
BY Woodling and Krost,
Attys.

United States Patent Office 2,931,956

Patented Apr. 5, 1960

2,931,956

REGENERATIVE RADIO RECEIVER FOR REMOTELY CONTROLLED RELAY

Lewis H. Van Arsdale, Lyndhurst, Ohio, assignor to Elliott & Evans, Inc., Fort Lauderdale, Fla.

Application February 6, 1956, Serial No. 563,575

9 Claims. (Cl. 317—149)

The invention relates in general to radio receivers and more particularly to a receiver circuit for receiving a modulated carrier and detecting the modulation, then amplifying it together with a direct current component derived in accordance with the modulation.

The invention has special use in a super-regenerative radio receiver circuit comprising a detector stage and an amplifier stage wherein the super-regenerative detector detects the modulation on a modulated carrier wave and as a part thereof has a capacity coupled regenerative carrier feedback. The modulation signal is passed to the amplifier stage which is a combined alternating current and direct current amplifier with the amplifier normally being biased at a point of small current flow insufficient to hold in a relay in the output of the amplifier in the absence of modulation. Upon the incidence of a modulated carrier being detected and passed to the amplifier, the amplifier is constructed and arranged to amplify this modulated signal and to pass a portion of the modulated output to a rectifier circuit which establishes a direct current bias which is fed back to the amplifier in a direction to increase the amplification of the amplifier. This causes the amplifier to increase its gain for direct current amplification and also to increase its gain for the modulation amplification which together is sufficient to energize the relay to the pull-in point. An impedance is provided interconnecting the inputs of the detector and amplifier stages which acts as a grid leak for the regenerative feedback capacity coupling and introduces a negative feedback from the amplifier to the detector for any extraneous signals reaching the amplifier.

An object of the invention therefore is to provide a combined alternating current and direct current amplifier and especially one which is very stable in operation.

Another object of the invention is to provide a combined detector and amplifier for detecting intelligence on a carrier and operating a control device in accordance with the detected signal.

Still another object of the invention is to provide a super-regenerative detector and subsequent amplifier stage with the detector suitable for operation in many spectrums including the VHF range and with the modulation in the audio or super-audio range, yet which combined detector and amplifier is stable in operation despite variations in vacuum tubes or circuit components.

Still another object of the invention is to provide a combined super-regenerative detector and amplifier wherein capacity coupling is provided from the output of the detector to the input of the detector, and a resistor provides negative feedback from the amplifier input to the detector input for extraneous signals reaching the amplifier.

Another object of the invention is to provide an amplifier which is biased near cut-off; and yet when a signal to be amplified is received on the input of the amplifier, such signal is amplified, but in itself is insufficient to energize a relay or other load in the output of the amplifier, and also a portion of the modulation amplified output is passed to a rectifier which develops a substantially direct current bias which is fed back to increase the amplification of the amplifier for both increased direct current amplification and modulation frequency amplification to thus energize the load.

Other objects and a fuller understanding of this invention may be had by referring to the following description and claims, taken in conjunction with the accompanying drawing, in which:

The single figure is a schematic diagram of the preferred embodiment of the invention.

The single figure shows the radio circuit 11 which generally incorporates a detector stage 12 and an amplifier stage 13. The detector stage 12 includes a vacuum tube 14 as illustrative of one form of detecting device, and actually this vacuum tube 14 may be in the same envelope as the vacuum tube 15 which forms a part of the amplifier stage 13. The detector stage 12 is energized from an antenna 17 with an antenna coil 18 energized between the antenna 17 and ground 21. The antenna coil 18 is coupled to an input coil 22 as shown by the variable coupling arrow 23, and because of the high frequencies with which this circuit may be used, the input coil 22 may actually take the physical shape as shown in the drawing with first and second end connections 25 and 26 and a mid-connection 27.

This circuit has been found to work very well with frequencies in the VHF range, for example, from 200 to 300 megacycles. At such frequencies the input coil 22 may be generally U-shaped, about .75 inch across and 2 inches long. A variable capacitor 29 is connected across the end connections 25 and 26 to resonate with the input coil 22 at the carrier frequency.

The detector tube 14 includes a cathode 31, grid 32, and plate 33 which hereafter are generally referred to by these commonly accepted terms; yet it will be understood by those skilled in the art that transistors or the equivalent might be substituted, and hence, the cathode is an electron emission means, the grid is an electron control means, and the plate is an electron collector means. In the vacuum tube shown there is also the customary filament 34 for heating the cathode 31. The plate 33 is connected directly to the first end connection 25, and the cathode 31 is directly connected to ground 21. The grid 32 is connected to the amplifier stage 13 by a resistor 36 and connected to the second connection 26 of the input coil 22 through an RF or carrier pass capacitor 35. This provides regenerative feedback from the input coil 22 to the grid 32 and thus, together with resistor 36, permits the detector tube 14 to operate as a super-regenerative detector.

The mid-connection 27 is connected through an RF choke 37 to a first end connection 39 of a first parallel resonant circuit 38. The second end connection 40 of this parallel resonant circuit 38 is connected to ground through a modulation frequency pass capacitor 41. The parallel resonant circuit 38 includes a variable inductance 42 and a capacitor 43. This parallel resonant circuit 38 is tuned to be resonant to the modulation frequency adapted to be present on the RF carrier, which modulation frequency might be in the order of ten to fifty kilocycles.

The amplifier stage 13 is energized from the output of the detector stage 12 and the amplifier tube 15 again includes electron emission, control, and collector means which for convenience are termed the cathode 46, grid 47, and plate 48. The grid 47 is energized from the parallel resonant circuit 38 through a modulation frequency coupling capacitor 49 and a coupling resistor 50. The cathode 46 is connected to ground through a variable cathode biasing resistor 52, which resistor has a variable tap 53. The plate 48 is connected to the first end connection 55 of a coupling winding 56, and a second end connection 57 of the winding 56 is connected to one end of a coil 58 of a relay 59. The other end of this coil 58 is connected to a B+ line 60. A positive direct current voltage is supplied to this B+ line 60 from a rectifier 61 energized from a transformer winding 62 and as filtered by a capacitor 63. A voltage dropping resistor 66 interconnects the B+ line 60 and the cathode 46 and together with the variable cathode biasing resistor 52 form a voltage divider network between B+ line 60 and ground. This provides the means for establishing the correct bias for tube 15. The cathode 46 is also connected to ground through a modulation frequency by-pass capacitor 67. The coupling winding 56 preferably comprises a transformer primary, and a high frequency pass capacitor 69 is connected from terminal 55 to ground. Also, a capacitor 70 is connected across the relay coil 58 to provide a time delay for the operation of the relay contacts 71, and the capacitor 70 additionally prevents chatter of the contacts 71.

A second parallel resonant circuit 74 has a transformer secondary 75 inductively coupled to the primary 56. A capacitor 76 is connected across the secondary 75 and this secondary 75 has an adjustable core for tuning to the modulation frequency. A first end connection 77 of the parallel resonant circuit 74 is connected to one terminal of a diode rectifier 78 and the second end connection 79 of this parallel resonant circuit 74 is connected to ground. A high frequency by-pass capacitor 80 is connected across the diode rectifier 78. A diode load resistor 81 is connected between ground and the other terminal of rectifier 78. The diode load resistor is the load for the rectifier 78 and develops a voltage thereacross. This voltage is filtered by a filter capacitor 82 connected across resistor 81 to establish a direct current bias voltage. A test jack 83 is connected at the upper end of load resistor 81. The direct current bias voltage is passed by a time delay circuit 85 to the grid 47. This time delay circuit 85 includes the serially connected resistors 86 and 87 and the capacitor 88 connected to ground.

The detector stage is supplied with operating voltages from the B+ line 60 through the voltage dropping resistor 91, and the resistor 36 is a form of a grid leak resistor connecting the amplifier cathode 46 to the detector grid 32. This forms a negative feedback to the detector input for extraneous signals reaching the amplifier 13.

*Operation*

One use for this radio circuit 11 has been in the radio controls associated with electrically controlled garage door operators. In such use several different carrier frequencies are selectively used and several different modulation frequencies are selectively used so that for X number of carrier frequencies and Y number of modulation frequencies, a total of XY combinations are possible. Any particular radio circuit 11, however, may be designed to operate at only a single carrier frequency and only a single modulation frequency. Merely by way of example, let us assume that a 250 megacycle carrier is used with a 25 kilocycle modulation frequency.

The modulated carrier is received on the antenna 17 and passed from the antenna coil 18 to the input coil 22. The variable capacitor 29 may be adjusted to resonate to the 250 megacycle carrier thus developing a maximum carrier voltage across the end connections 25 and 26. The detector tube 14 operates essentially as a Colpitts oscillator and as such utilizes the interelectrode capacity 94 from plate to cathode and the interelectrode capacity 95 from grid to cathode in order to complete this Colpitts circuit to provide a complete RF path. Energy is fed back out of phase to cause regeneration by the RF pass capacitor 35 and sufficient energy is fed back and the values of the capacitor 35 and resistor 36 are of such magnitude as to cause the circuit to act as a super-regenerative detector, thus this first stage 12 is an amplifier of both the carrier and modulation frequencies. As an example, at these RF frequencies, capacitor 35 may be a fifty micro micro-farad capacitor and the resistor 36 may be 60,000 ohms. This establishes a quenching frequency in the detector which generally is between the modulation and carrier frequencies and in practice has been found to be in the order of 180 kilocycles.

The RF choke 37 prevents practically all of the RF carrier from being transmitted to the first parallel resonant circuit 38, which is tuned to the modulation frequency, so as to develop a maximum of modulation frequency voltage across the terminals 39 and 40. This voltage is then impressed on the amplifier grid 47 through the coupling capacitor 49 and resistor 50, and the capacitor 41 passes modulation frequency to ground to complete the input circuit to the amplifier stage 13 by way of the modulation frequency by-pass capacitor 67 and variable cathode bias resistor 52.

The B+ line, it is noted, is connected to the cathode 46 through the voltage dropping resistor 66, and this resistor 66 is very much larger in resistance value than resistor 52 so that only a small positive bias is established on the cathode 46. The variable tap 53 is adjusted so that with no signal appearing on the antenna 17 there is only a small voltage developed across the relay coil 58. This voltage might be in the order of five volts for a relay coil which requires twenty volts for pull-in.

The amplifier tube 15 is biased to a proper operating condition, which is one of relatively low output current, or somewhat near to cut-off, by the setting of the variable tap 53. When a modulated signal appears on the antenna 17, it is detected by the detector stage 12 and the modulation frequency passed to the amplifier stage 13. The amplifier tube 15 will amplify to a certain extent the modulation frequency appearing on the grid 47. The second parallel resonant circuit 74 is tuned to this modulation frequency, and the transformer 56—75 is preferably a step-up transformer so that this resonance reflects to the primary 56, and therefore the majority of the modulation frequency voltage in the output of the amplifier tube 15 will appear across the coupling coil 56. None of the amplified modulated output of amplifier 15 will appear across the relay coil 58 because of the large shunting capacitor 70.

The amplified modulation frequency voltage appearing across the coupling coil 56 is passed inductively to the parallel resonant circuit 74 which thus becomes a voltage source to energize the series connection of the diode rectifier 78 and load resistor 81. Half wave pulses of voltage at the modulation frequency appear across this load resistor 81 which are filtered by the filter 82 and applied by time delay and coupling network 85 as a direct current bias in a positive direction on the grid 47. This decreases the impedance of the amplifier tube 15 by shifting operation to a more favorable portion of the operating characteristic curve, thus causing it to draw considerably more plate current, causing the tube to simultaneously operate as an efficient alternating current amplifier for the modulation frequency energy. At the same time, it amplifies the direct current energy resulting from the rectification of the modulation frequency energy developed across parallel resonant circuit 74, rectified by diode 78, impressed across load resistor 81 and filter capacitor 82, and subsequently fed to grid 47 via coupling network 85.

The resistor 36 acts as a negative feedback resistor from the amplifier cathode 46 to the detector grid 32, with this being a negative feedback of any spurious or extraneous signals which may happen to reach the amplifier. This resistor 36 also may be considered a grid leak resistor because it also provides a discharge path for discharging the negative charge appearing on capacitor 35 when the grid 32 draws current as it does in acting as a super-regenerative detector. The values of the components in the parallel resonant circuits 38 and 74 are preferably selectively chosen in accordance with the modulation frequency at which the receiver circuit 11 is designed to operate. Further, the value of the modulation frequency cathode by-pass capacitor 67 is chosen in accordance with the operating modulation frequency. For example, at the 25 kilocycle modulation frequency in the example above, this capacitor 67 might be .01 micro-farad, but this capacitor is not essential to the correct operation of the circuit.

The amplifier stage 13, when operating with no modulated signal being detected and amplified, provides insufficient current to energize the relay 59 to the pull-in point. The transformer is preferably a step-up transformer and with the values given, that is, with about five volts across the relay coil with no signal, a very small voltage such as .1 to 1.5 volts appears at the test jack 83, because of random noise, principally.

When a modulated signal is being detected and amplified, the amplifier tube 15 is then operating essentially as a class A amplifier with the plate current swinging at the modulation frequency rate about a mean value of direct current which is caused by the increased direct current amplification. With a modulation signal appearing, there is approximately four or five volts at the test jack 83, yet this actually applies only about one or two volts positive on the grid 47, because, as the grid goes positive, grid current limits the rise of the positive grid voltage. As previously stated, the increase in direct current amplification of the tube 15 is that which primarily pulls in the relay 59, nevertheless the modulation frequency amplification in amplifier 15 is in the right direction to aid pull-in because this does increase the average plate current somewhat.

It will therefore be seen that the present radio circuit 11 provides a combined detector and amplifier with the amplifier operating both as an alternating current and direct current amplifier. The two tubes 14 and 15 may be in the same envelope, as previously stated, and may be a tube such as a 12AT7. Because of variations among successive tubes which may be used in successive circuits, and because of variations in values of circuit components themselves, production receiving circuits may vary slightly in characteristics. For example, there must be sufficient feedback through the capacitor 35 to establish the detector stage 12 as a super-regenerative detector and this depends upon the interelectrode capacity within the detector tube 14. There must be sufficient regenerative feedback to make the tube oscillate at the carrier frequency, and the values of capacitor 35 and resistor 36 must be chosen to get the proper quenching action in the process of super-regenerative detection. It has been found that the resistor 36 coupling the amplifier cathode 46 to the detector grid 32 introduces a negative feedback to the input of the detector at the modulation frequency and this prevents any tendency for stray feedback to cause the circuit to go into unwanted oscillation. This negative feedback is achieved by the inherent 180 degree phase shift occurring between the grid and plate of a tube. The value of the cathode by-pass capacitor 67 is decreased with increasing modulation frequency and carefully related thereto so that the negative feedback effect on the detector grid is not completely eliminated, that is, the cathode 46 is only partially by-passed for modulation frequencies.

Although this invention has been described in its preferred form with a certain degree of particularity, it is understood that the present disclosure of the preferred form has been made only by way of example and that numerous changes in the details of the circuit and the combination and arrangement of circuit elements may be resorted to without departing from the spirit and the scope of the invention as hereinafter claimed.

What is claimed is:

1. An electronic circuit comprising, a first stage and an amplifier stage, said first stage including input and output means, means for energizing said input means with a signal to be amplified, said amplifier stage having input and output means, means to couple signals from said first stage output means to said amplifier input means, a load, means for connecting said load to said output means of said amplifier, means to obtain a bias from the output means of said amplifier stage, means for applying said bias to said amplifier input means for biasing same in an amplification increasing direction upon signals being passed to said amplifier output means, and feedback means for applying as negative feedback to said first stage input means any signals reaching said amplifier.

2. An electronic circuit comprising, a first stage and an amplifier stage, said first stage including input and output means, means for energizing said input means with an alternating current signal to be amplified, said amplifier stage having input and output means, means to couple signals from said first stage output means to said amplifier input means, a relay having a relay coil, means for connecting said relay coil to said output means of said amplifier, means to obtain a substantially direct current bias from the output means of said amplifier stage, means for applying said bias to said amplifier input means for biasing same in an amplification increasing direction upon signals being passed to said amplifier output means, and feedback means for applying as negative feedback to said first stage input means any signals reaching said amplifier and for applying as regenerative feedback to said first stage input means any signals reaching said first stage output means.

3. An electronic circuit comprising, a first stage and an amplifier stage, said first stage including input and output means, means for energizing said input means with a signal to be amplified, feedback means connecting said output means to said input means for regenerative signal feed thereto, said amplifier stage having input and output means, means to couple signals from said first stage output means to said amplifier input means, a first load, means for connecting said first load to said output means of said amplifier, a rectifier, a second load connected to said rectifier, means to apply signals from said amplifier output means to the combination of said rectifier and second load to develop a bias across said second load, means for applying the bias obtained across said second load to said amplifier input means for biasing same in an amplification increasing direction upon signals being passed to and rectified by said rectifier, and a negative feedback impedance interconnecting said amplifier and first stage input means for applying as negative feedback to said first stage input means any extraneous signals reaching said amplifier stage.

4. A radio receiver for receiving a modulated carrier, said receiver including a detector stage and a combined alternating current and direct current amplifier stage, said detector stage including input and output means, means for energizing said input means, a carrier frequency pass capacitor connecting said output means to said input means for regenerative carrier feed thereto, said combined alternating current and direct current amplifier stage having input and output means, means to couple modulation frequency signals from said detector output means to said amplifier input means, a relay having a relay coil, means for connecting said relay coil to said output means of said amplifier, a rectifier load resistor, a rectifier connected in series thereto, means to apply modulation frequency from said amplifier output means to the series combination of said rectifier and said load resistor to develop a bias thereacross, means for applying the bias obtained across said load resistor to said amplifier input means for biasing same in an amplification increasing direction upon modulation signals being passed to and rectified by said rectifier, and a negative feedback impedance interconnecting said amplifier and detector input means for applying as negative feedback to said detector input means any extraneous signals reaching said amplifier.

5. A radio receiver for receiving a modulated carrier, said receiver including a detector stage and a combined alternating current and direct current amplifier stage, said detector stage including input and output means, means for energizing said input means, a carrier frequency pass capacitor connecting said output means to said input means for regenerative carrier feed thereto, said combined alternating current and direct current amplifier stage having input and output means, means to couple modulation frequency signals from said detector output means to said amplifier input means, a relay having a relay coil, means for connecting said relay coil to said output means of said amplifier, variable biasing means capable of biasing said amplifier near cut-off, a modulation frequency by-pass capacitor connected to said amplifier input means, a rectifier load resistor, a rectifier connected in series thereto, means to apply modulation frequency from said amplifier output means to the series combination of said rectifier and said load resistor to develop a bias thereacross, means for applying the bias obtained across said load resistor to said amplifier input means for biasing same in an amplification increasing direction upon modulation signals being passed to and rectified by said rectifier, and a negative feedback impedance interconnecting said amplifier and detector input means for applying as negative feedback to said detector input means any extraneous signals reaching said amplifier.

6. A radio receiver for receiving a modulated carrier, said receiver including a detector stage and a combined alternating current and direct current amplifier stage, said detector stage including electron control means, an input coil, means for connecting said input coil to energize said detector stage, a carrier frequency pass capacitor connecting said input coil to said electron control means for carrier feed thereto, a modulation frequency output for said detector, said combined alternating current and direct current amplifier stage having input and output means, means to couple modulation frequency signals from said detector output to said amplifier input means, a transformer primary, a relay having a relay coil, means for connecting in series said relay coil, said transformer primary, and the output means of said amplifier, variable biasing means capable of biasing said amplifier to a relatively low current conduction valve, rectifier means, a rectifier load resistor connected to said rectifier means, means to apply modulation frequency from said amplifier output means to the combination of said rectifier and load resistor to develop a bias across said load resistor, means for applying said bias to said amplifier input means for biasing same in an amplification increasing direction upon modulation signals being passed to and rectified by said rectifier means, and a negative feedback impedance interconnecting said amplifier input means and said detector electron control means for applying as negative feedback thereto any extraneous signals reaching said amplifier.

7. A radio receiver for receiving a modulated carrier, said receiver including a detector stage and a combined alternating current and direct current amplifier stage, said detector stage including electron control means, an input coil, means for connecting said input coil to energize said detector stage, a carrier frequency pass capacitor connecting said input coil to said electron control means for carrier feed thereto, a parallel resonant circuit tuned to the modulation frequency, means for connecting said parallel resonant circuit to said detector stage as a load therefor, said combined alternating current and direct current amplifier stage having input and output means, means to couple modulation frequency signals from said parallel resonant circuit to said amplifier input means, a transformer primary, a relay having a relay coil, means for connecting in series said relay coil, said transformer primary, and the output means of said amplifier, variable biasing means capable of biasing said amplifier to a relatively low current conduction valve, a modulation frequency by-pass capacitor connected to said amplifier input means, rectifier means, a rectifier load resistor connected to said rectifier means, means to apply modulation frequency from said amplifier output means to the combination of said rectifier and load resistor to develop a bias across said load resistor, means for applying said bias to said amplifier input means for biasing same in an amplification increasing direction upon modulation signals being passed to and rectified by said rectifier means, and a negative feedback impedance interconnecting said amplifier input means and said detector electron control means for applying as negative feedback thereto any extraneous signals reaching said amplifier.

8. A radio receiver for receiving a modulated carrier, said receiver including a detector stage and a combined alternating current and direct current amplifier stage, said detector stage including electron control means, an input coil energizable from an antenna, means for connecting said input coil to energize said detector stage, a carrier frequency pass capacitor connecting said input coil to said electron control means for regenerative carrier feed thereto, a parallel resonant circuit tuned to the modulation frequency, means for connecting said parallel resonant circuit to said detector stage as a load therefor, said combined alternating current and direct current amplifier stage having electron emission, control and collector means, means to couple modulation frequency signals from said parallel resonant circuit to said amplifier control means, a transformer primary, a load, a variable biasing resistor connecting said amplifier electron emission means to ground, means including said variable biasing resistor for connecting in series said load, said transformer primary, and the electron emission and collector means impedance of said amplifier, rectifier means connected to be energized from the output of said amplifier stage, a rectifier load resistor connected to said rectifier means to develop a bias across said load resistor, means for obtaining a substantially direct current bias from said load resistor and applying same to said amplifier electron control means for biasing same in a positive direction upon modulation signals being rectified by said rectifier means, and a negative feedback resistor interconnecting said amplifier electron emission means and said detector electron control means for applying as negative feedback thereto any extraneous signals reaching said amplifier.

9. A radio receiver for receiving a modulated carrier, said receiver including a detector stage and a combined alternating current and direct current amplifier stage, said detector stage including a detector having electron emission, control and collector means, an input coil energizable from an antenna, means for connecting said input coil to said electron emission and collector means, a carrier frequency pass capacitor connecting said input coil to said electron control means for regenerative carrier feed thereto, a parallel resonant circuit tuned to the modulation frequency and having first and second end connections, radio frequency choke means for interconnecting said input coil and said first end connection of said parallel resonant circuit, said combined alternating current and direct current amplifier stage having electron emission, control and collector means, means to couple modulation frequency signals from the first end of the said parallel resonant circuit to said amplifier control means, means for applying a positive direct current operating voltage for operating said detector and amplifier, a transformer primary, a relay having a relay coil, a variable biasing resistor connecting said amplifier electron emission means to ground, a modulation frequency by-pass capacitor connecting said amplifier electron emission means to ground, means including said variable biasing resistor and said modulation frequency by-pass capacitor for connecting in series said relay coil, said transformer primary, and the electron emission and collector means impedance of said amplifier, a voltage dropping resistor connecting said positive direct current operating voltage to said amplifier electron emission means, said variable biasing resistor together with said voltage dropping resistor comprising a voltage divider to bias said amplifier to a relatively low current value insufficient to cause pull-in of said relay, a second parallel resonant circuit including a secondary inductively coupled to said transformer primary, rectifier means connected to be energized from said second parallel resonant circuit, a rectifier load resistor connected to said rectifier means to develop a bias across said load resistor, filter means for obtaining a substantially direct current bias from said load resistor, means for applying said direct current bias to said amplifier electron control means for biasing same in a positive direction upon modulation signals being rectified by said rectifier means to bias the amplifier to a condition of greater amplification of the modulation frequency and simultaneously to amplify the direct current bias applied thereto from the output of said load resistor to energize said relay to the pull-in point, and a negative feedback resistor interconnecting said amplifier electron emission means and said detector electron control means for applying as negative feedback thereto any extraneous signals reaching said amplifier.

References Cited in the file of this patent

UNITED STATES PATENTS

| | | |
|---|---|---|
| 2,128,642 | Foster | Aug. 30, 1938 |
| 2,182,329 | Wheeler | Dec. 5, 1939 |
| 2,298,629 | Schaper | Oct. 13, 1942 |
| 2,398,214 | Emerson | Apr. 9, 1946 |
| 2,410,768 | Worcester | Nov. 5, 1946 |
| 2,576,495 | Wood | Nov. 27, 1951 |
| 2,581,456 | Swift | Jan. 8, 1952 |
| 2,584,132 | Kirkman | Feb. 5, 1952 |
| 2,654,002 | Hooijkamp et al. | Sept. 29, 1953 |
| 2,760,009 | Boer | Aug. 21, 1956 |

FOREIGN PATENTS

| | | |
|---|---|---|
| 723,061 | Great Britain | Feb. 2, 1955 |